Dec. 11, 1945.  J. G. HOLMSTROM  2,390,711
REMOTE CONTROL FOR VARIABLE SPEED TRANSMISSIONS
Filed Nov. 26, 1943  2 Sheets-Sheet 2
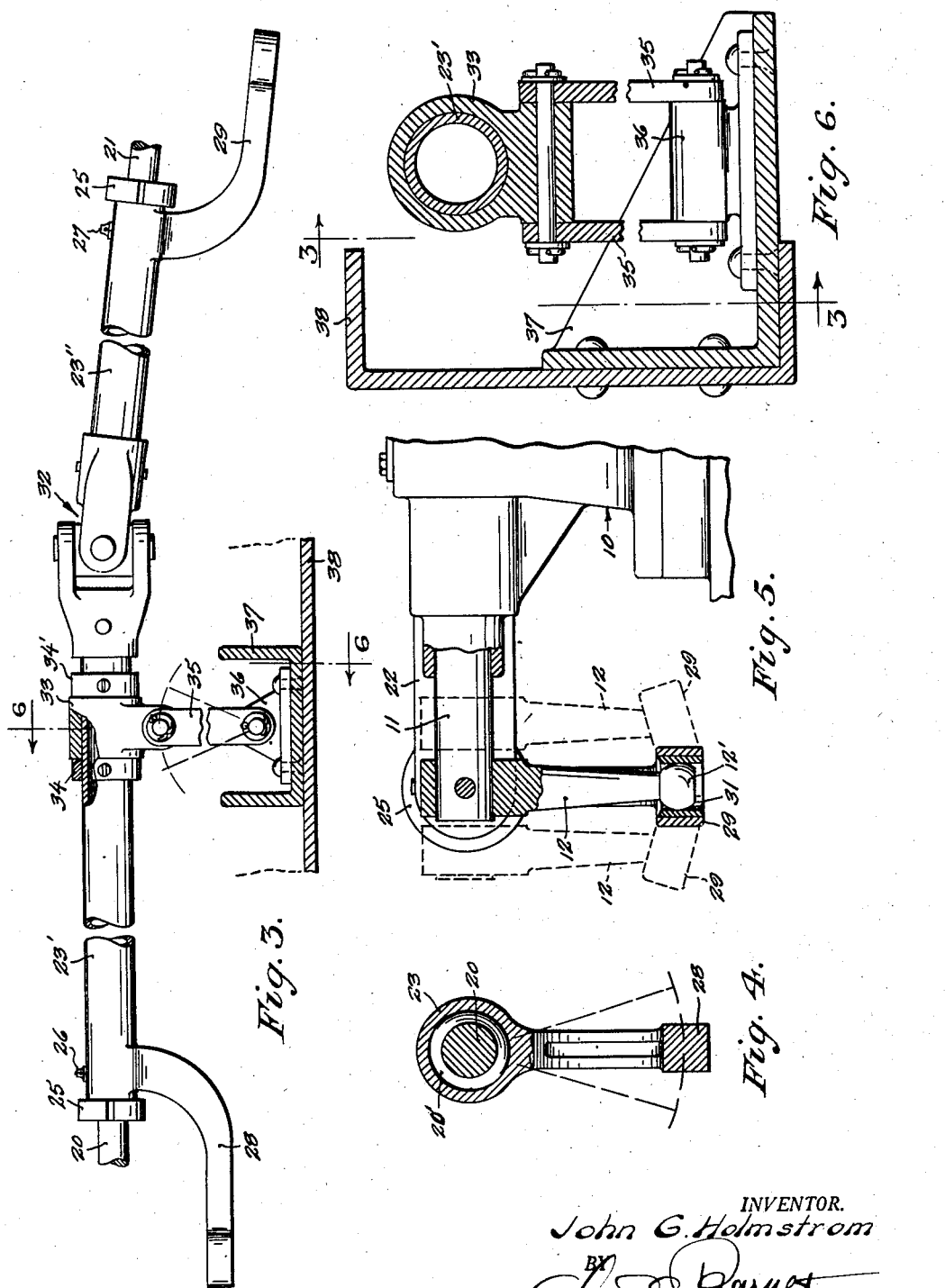
INVENTOR.
John G. Holmstrom Patented Dec. 11, 1945

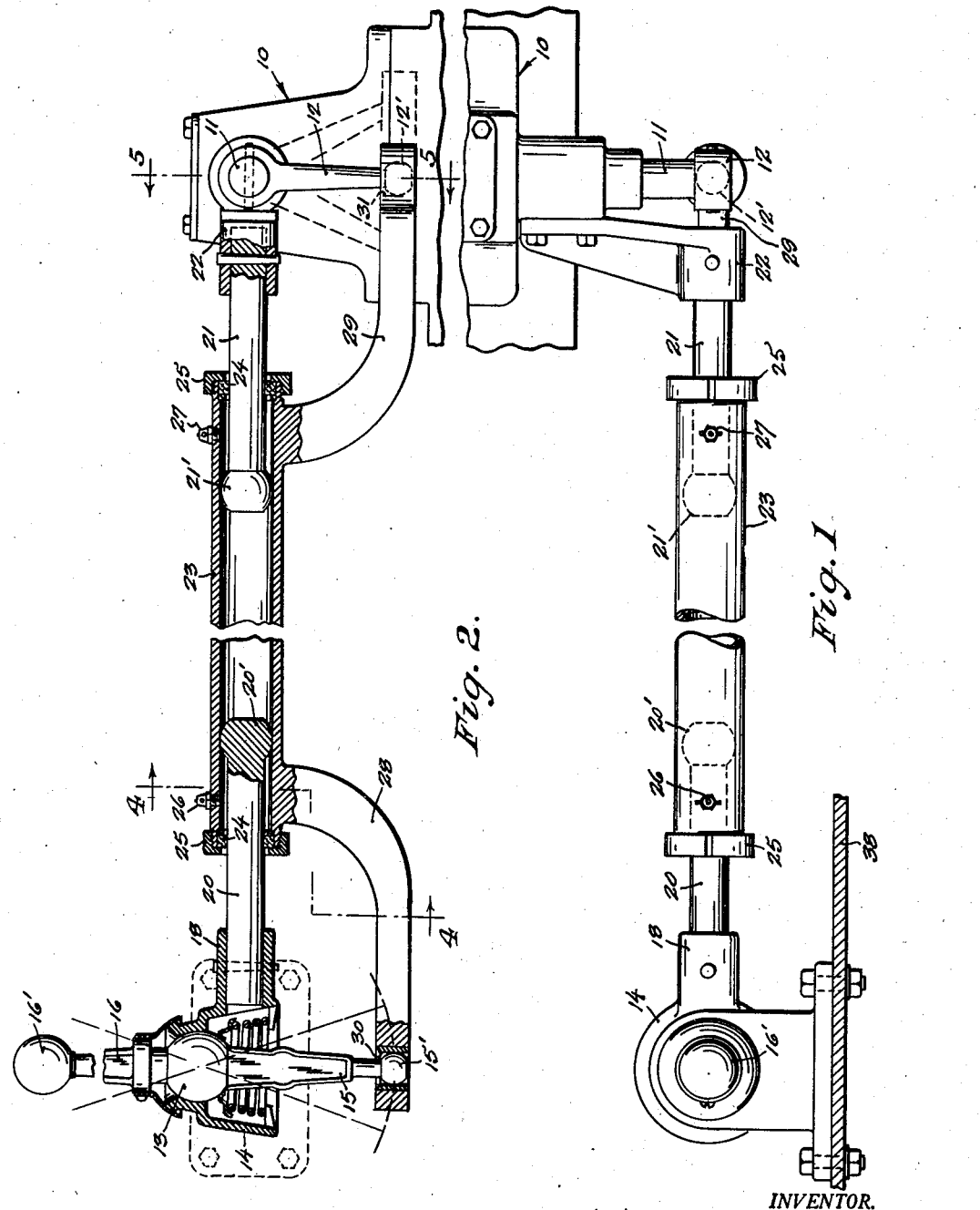

2,390,711

UNITED STATES PATENT OFFICE 2,390,711

REMOTE CONTROL FOR VARIABLE-SPEED TRANSMISSION

John G. Holmstrom, Seattle, Wash., assignor to Kenworth Motor Truck Corporation, Seattle, Wash., a corporation of Washington Application November 26, 1943, Serial No. 511,891

6 Claims. (Cl. 74—473)

This invention relates to a shift control for change-speed transmissions, and particularly a control applicable to that character of vehicle construction, or for that matter a stationary plant, in which the change-speed gear box responsible for changing the speed ratio between an engine and its output shaft is controlled from a manually operated shifting lever disposed at a point remote from the said gear box. The principal object is to provide a perfected mechanical connection running from the shift-lever to the gear box and which is essentially characterized in its ability to substantially eliminate the "play" which has characterized all prior mechanical connections of which I am aware looking to a reproduction, in a variable-speed transmission, of the movements of a shift-lever occupying a position removed therefrom.

The invention has the further and particular object of providing a transfer-connection between two such separated parts, a gear box and its shift-lever, permitting the said transfer to be carried through a non-rectilineal path and in consequence admitting to greater flexibility in vehicular design.

As a further and particular object still, the invention aims to devise a mechanism for the above purpose including a member journaled for both rocker and endwise movements and which is so engineered as to substantially preclude access of dust or other destructive foreign matter to the bearings therefor.

The foregoing, with other and still more particular objects and advantages, will appear in the course of the following description and claims, the invention consisting in the novel construction and in the adaptation and combination of parts hereinafter described and claimed.

In the accompanying drawings:

Figure 1 is a top plan view illustrating one embodiment of the present invention as applied to a typical remote-control shifting installation, the transmission being shown fragmentarily and a framing piece to which the shift-lever is attached being indicated in section.

Fig. 2 is a view partly in side elevation and partly in longitudinal vertical section with the section taken on the longitudinal median line of the transfer mechanism.

Fig. 3 is a fragmentary side elevation of the invention deleting the shift-lever and the transmission and indicating, as a modification, the manner in which the transfer-rod is given an angular form when, for one reason or another, a straight rod is precluded.

Fig. 4 is a detail transverse vertical section on broken line 4—4 of Fig. 2.

Fig. 5 is a transverse vertical section on line 5—5 of Fig. 2 with parts being shown in elevation; and Fig. 6 is a detail transverse vertical section taken to an enlarged scale on broken line 6—6 of Fig. 3.

As a brief preliminary to a detailed description of the invention, it may be stated that remote-control shifting is made necessary where, for example, a vehicle has its engine mounted at the rear and the driver's cab at the front. The transmission perforce occupies a position between engine and differential, whereas the shift-lever's position is determined by the location of the cab, and thus calls for a transfer connection from the forwardly disposed shift-lever to the rearwardly disposed differential. There have been various efforts made to engineer practical remote-control systems which are purely mechanical in nature, as distinguished from systems having recourse to fluids or electricity as the operating agency, but these said mechanical systems have, heretofore, been quite sloppy or, to use the term more commonly employed in the industry, "spongy." This condition of sponginess exists to a troublesome degree on even a transfer of comparatively short length as, for example, on a vehicle construction having the cab mounted above the engine—thus placing the transmission somewhat to the rear of the cab—but perforce becomes the more pronounced the longer the carry.

Clarity in an understanding of the present invention will, it is thought, be advanced by here further stating that, insofar as the transmission itself is concerned, a more or less standard construction is one in which the gears thereof are caused to be shifted by the movement of a shaft occupying a transverse position above the gears and supported for both rocker and end movements, the said end movements being for selection purposes and the rocker movements performing the change-gear action. This said control shaft customarily has its end exposed, and it is usual to apply a lever arm upon this said exposed end as a means of rocking the control shaft and of sliding the same axially, the problem of mechanically transmitting the counterpart of these movements performed upon a shift-lever to the said control shaft of the transmission being essentially one of reducing "play." Perhaps the most efficient of the prior attempts to meet the problem is a comparatively recent development wherein a tie-rod is carried on a rectilineal line directly from the free end of the transmission's lever arm to the free activating end of the manually operated shift-lever, and this said tie-rod is guided for bodily lateral and endwise movement by yoking the two ends of the same in terminal forks provided upon arms which are dropped from a paralleling guide-bar which is journaled for rocker movements above the tie-rod. The two drop-arms being fast to the guide-bar, the movement of the one must find a corresponding movement of the other, and this said prior assembly consequently operates to hold the input and the output ends of the tie-rod fairly well in line, but from the fact that relative endwise movement obtains between the tie-rod and the yokes, and an inability to effectively lubricate or to seal the bearing surfaces against access of road grit, makes the arrangement subject to considerable wear and the same becomes "spongy" after a relatively short period of usage.

Now describing the present invention and first having reference to the embodiment illustrated in Figs. 1 and 2, the numeral 10 designates the transmission case, 11 the referred-to control shaft which, as stated, is arranged for rocker and endwise movements, and 12 the lever arm which is fixedly secured to the exposed end and which, by bodily transverse movement, shifts the control shaft axially, and, by forward or rearward swinging movement about the center of the shaft as an axis, rocks the control shaft. Produced upon the free end of the lever arm is a ball-head 12'.

The manual shift-lever, as illustrated in these said views, is a lever of the first order having a ball fulcrum 13 working in a mating socket of a frame-carried casting 14, and presenting an operating knob 16' upon the upwardly extending arm 16 and having a ball-head 15', the counterpart of the ball-head 12', upon the free extremity of the other and depending arm 15.

There is provided, and which I indicate as being an integral part of the casting 14, a hollow boss 18, and fixedly socketed therein is the butt part of a stud 20 which has a ball-shaped head 20' formed upon its exposed extremity; and the substantial counterpart of this stud is found in a matching but opposingly disposed element 21 having a like ball-shaped head 21' and which is fixedly socketed in a bracket 22 boltably attached to the transmission case. Each said stud desirably is disposed such that a projection of its axial line traverses the related lever arm 15 or 12, as the case may be, upon a neutral positioning of the latter, and in the embodiment here described the said studs are approximately co-axial although an exact alignment is unnecessary.

Extending from one to the other of said studs and applied over and receiving both a slipper and a rocker bearing from the ball-heads of the latter is a tube 23 of a length somewhat exceeding the span between said heads, and carried at the ends of the tube to perform a protective function against the admission of dust are sealing felts 24 retained by caps 25. Suitable fittings 26—27 are provided for lubrication purposes. Indicated at 28 and 29 and prolonged as goose-neck extensions from opposite ends of the tube are curvilinear cranks carried on the one hand to the lever arm 15 and on the other hand to the lever arm 12, and terminally provided in these cranks are cylindrical sockets, as 30 and 31, arranged and adapted to receive the ball-head 15' and the ball-head 12', respectively.

From the foregoing it is believed to be readily understood that the present invention provides a transfer-rod—the tube 23 with its integral crank extensions 28 and 29—which is entirely self-sufficient as a means of transmitting the movements of the shift-lever to the control shaft of the transmission, the salient characteristic being a provision for either sliding or rotational movement on or about a fixed axis and by direct connection at one end with the reactive arm 15 of the shift-lever and at the other end with the lever 12 which governs the transmission firmly transferring to the transmission's control shaft the movements given to the shift-lever.

Now proceeding to the embodiment shown in Fig. 3, it is self-evident that it is desirable on occasion, and to meet given conditions, to so engineer a vehicle as to make it a matter of some difficulty, if not impossible, to work a straight transfer-tube from the shift-lever to the transmission and, to exemplify a condition of this nature, I have illustrated a vehicle construction which assumes the two studs to be so mounted that intersecting axial prolongations thereof are diagonal, one to the other, such being caused, say, by the exigencies of a given vehicle design or perhaps by the presence of an obstruction which would preclude use of a straight transfer-tube. In applying the present invention to such a circumstance, the procedure is to employ two or more tube sections, as 23' and 23'', and introduce a universal joint 32 between the same, such being made possible by the fact that, as above stated, the tube is self-guiding and thus made self-sufficient to the end in view. Acting in complement with the universal joint, or joints, according as to whether two, or more than two, articulating tube sections are applied, I provide a hanger which acts to guidably support the joint. A hanger which I prefer to employ consists of a swinging journal-sleeve 33 held between set collars 34—34' and shackled by parallel links 35 to a stationary bed-block 36, the block being supported upon or by a bracket 37 attached to the vehicle frame 38. This swinging journal is especially desirable in its exclusion of dust from the bearing surfaces, and the slight deflection of the end of the tube as the bearing sleeve swings about the stationary block as an axis—responding to endwise movement of the tube—is readily accommodated by the ball shape of the bearing heads of the studs. It can be here mentioned that a swinging journal-sleeve of this character is also applicable to and becomes a desirable adjunct to a single, as well as an articulated, tube assembly where the span is considerable between the two studs 20 and 21, being applied in such case intermediate the two ends of the single tube. A tube of any appreciable length readily admits to a slight center deflection.

The invention and the manner of its operation should be clear from the foregoing. Various departures from the illustrated and described embodiments will readily suggest themselves to those versed in the art, and it is accordingly my intention that no limitations be implied.

What I claim is:

1. In a variable-speed transmission assembly providing a transversely disposed control shaft fitted with a controlling lever arm, the shaft being supported for endwise and rocker movements with the said endwise movement acting to select and the said rocker movement to change the gears in accordance with the selection, and having a remote-control shift-lever longitudinally removed from the transmission and providing an activating lever arm whose free end, by operation of the shift-lever, is selectively moved in either a transverse or a longitudinal direction, the combination with said control shaft and its lever arm, and with the lever arm of the shift-lever: a stud disposed in proximal and fixed relation to the fulcrum of the shift-lever pointing in the general direction of the transmission and occupying a position spaced above the free end of the activating lever arm midway between the two extremes of the latter's transverse movement; a complementing and opposingly disposed stud mounted in proximal and fixed relation to the rocker axis of the transmission's lever arm and occupying a position midway between the extremes of the latter's axial movement above the free end thereof; and a tube of a length exceeding the span between said studs introduced between the transmission and the shift-lever and having its ends journaled for both rocker and endwise movements over the studs, and formed upon each said end with a crank extension of which the one connects by its free end with the free end of the activating lever arm and the other by its free end with the free end of the transmission's lever arm.

2. A variable-speed transmission assembly according to claim 1 wherein the facing ends of the two studs are formed to present ball-shaped heads operating as the journal bearings for the two ends of the tube.

3. A variable-speed transmission assembly according to claim 1, the facing ends of the two studs being formed to present ball-shaped heads operating as the journal bearings for the two ends of the tube, and wherein the tube is terminally fitted with felts sealing the interior of the tube to preclude access of dust to the bearing surfaces.

4. A variable-speed transmission assembly according to claim 1 and, as a bearing complement to the studs, a sleeve forming a rotary journal for the tube and applied over the latter at a point intermediate the stud-supported ends, said sleeve being held against endwise movement in relation to the tube, and shackle links supporting the sleeve to guide the latter in the endwise movement of the tube.

5. In combination with a variable-speed transmission having a controlling lever arm the extremity of which is movable both transversely and longitudinally, and with a shift-lever longitudinally removed therefrom and providing an activating lever arm whose free end, by operation of the shift-lever, is movable in either a transverse or a longitudinal direction, selectively: a stud disposed in proximal and fixed relation to the fulcrum of the shift-lever pointing in the general direction of the transmission's lever arm and occupying a position spaced above the free end of the activating lever arm between the two extremes of the latter's transverse movement; a complementing and opposingly disposed stud mounted in proximal and fixed relation to the transmission and occupying a position spaced vertically from the free end of the controlling lever arm's free end between the two extremes of the latter's transverse movement; and a pair of cranks one serving as an input and the other as an output member having their hubs journaled upon the studs for both rocker and axial movements, the input crank upon the first-named and the output crank upon the last-named stud, and operatively interconnected one hub to the other to cause both axial and rocking movements of the hub of the input crank to be reproduced in the hub of the output crank, the free end of the activating lever arm being connected directly to said input crank, and the output crank being connected directly to the free end of the transmission's lever arm.

6. In combination with a variable-speed transmission having a control lever arm the extremity of which is movable both transversely and longitudinally, and with a lever longitudinally removed therefrom and working about a central ball-pivot to have one of the two arms of the last-named lever extend upwardly from the pivot and act as a manually-operated shifting arm and to have the other said arm of the last-named lever extend downwardly from the pivot and act as a responding activating arm, the free ends of the said two arms of the last-named lever being movable oppositely in unison in either a transverse or a longitudinal direction, selectively; a stud disposed in proximal and fixed relation to the fulcrum of such last-named lever, pointing in the general direction of the transmission, and occupying a position between the free ends of the two arms of the last-named lever in the longitudinal plane of a perpendicular raised from a point central to the two extremes of transverse movement of the said downwardly extending arm; a crank arranged to serve as an activating member directly responding to the movements given the last-named lever and having its hub journaled upon the stud for both rocker and axial movements and connected by its free end with the free end of the activating lever arm, giving rocker movements to the hub by transverse movements of the free end of the activating lever arm and axial movements to the hub by longitudinal movements of the free end of the activating lever arm; and means tied for unitary movement to the hub of the crank and having operative interconnection with the transmission's lever arm to cause the crank's hub to transmit, by its rocker and axial movements, transverse and longitudinal movements, respectively, to the free end of the transmission's lever arm.

JOHN G. HOLMSTROM.